US010823138B2

(12) United States Patent
Nies

(10) Patent No.: US 10,823,138 B2
(45) Date of Patent: Nov. 3, 2020

(54) COUNTERWEIGHT ASSEMBLY FOR USE DURING SINGLE BLADE INSTALLATION OF A WIND TURBINE

(71) Applicant: General Electric Company, Schenectady, NY (US)

(72) Inventor: Jacob Johannes Nies, Hertme (NL)

(73) Assignee: General Electric Company, Schenectady, NY (US)

( * ) Notice: Subject to any disclaimer, the term of this patent is extended or adjusted under 35 U.S.C. 154(b) by 118 days.

(21) Appl. No.: 16/118,574

(22) Filed: Aug. 31, 2018

(65) Prior Publication Data

US 2020/0072187 A1  Mar. 5, 2020

(51) Int. Cl.
*F03D 13/20* (2016.01)
*F03D 1/06* (2006.01)

(52) U.S. Cl.
CPC .......... *F03D 1/0658* (2013.01); *F03D 13/20* (2016.05); *F05B 2240/90* (2013.01)

(58) Field of Classification Search
None
See application file for complete search history.

(56) References Cited

U.S. PATENT DOCUMENTS 4,334,823 A * 6/1982 Sharp ...................... F03D 3/067
    416/117
2004/0253109 A1  12/2004 Wobben 2012/0306215 A1 * 12/2012 Wesby .................... F03D 7/026
    290/55
2013/0272876 A1 * 10/2013 Falkenberg ........... F03D 1/0658
    416/1
2013/0315740 A1 * 11/2013 Westergaard ......... F03D 1/0675
    416/204 R (Continued)

FOREIGN PATENT DOCUMENTS

DE    102009011603 A1    9/2010
EP        2924284 A1     9/2015

(Continued)

OTHER PUBLICATIONS

European Patent Application Serial No. EP17382609.0 filed Sep. 15, 2017.

(Continued)

*Primary Examiner* — Michael Lebentritt
(74) *Attorney, Agent, or Firm* — Dority & Manning, P.A.

(57) ABSTRACT

A method for installing a plurality of rotor blades to a rotatable hub secured atop a tower of a wind turbine includes providing a counterweight assembly having, at least, a mounting assembly and a counterweight mass secured at a distal end of the mounting assembly. The method also includes securing the mounting assembly at a first position on the hub of the wind turbine such that the counterweight mass biases the hub to rotate about its rotation axis in a first direction. Further, the method includes consecutively installing the plurality of rotor blades onto the hub of the wind turbine. Moreover, the method includes adjusting a position of the counterweight mass between each consecutive installation of the plurality of rotor blades to continuously change a center of gravity of the hub and maintain a balanced rotor of the wind turbine during installation of the plurality of rotor blades.

19 Claims, 7 Drawing Sheets

(56) References Cited

U.S. PATENT DOCUMENTS

| | | | | |
|---|---|---|---|---|
| 2015/0275853 A1* | 10/2015 | Canedo Pardo | ........ | F03D 80/00 |
| | | | | 29/889 |
| 2015/0275854 A1* | 10/2015 | Canedo Pardo | ........ | F03D 80/00 |
| | | | | 29/889 |
| 2015/0300175 A1* | 10/2015 | Pfeiffer | ................. | F03D 1/0658 |
| | | | | 29/889.1 |
| 2016/0090962 A1* | 3/2016 | Gil Moll | ............... | F03D 1/0658 |
| | | | | 416/144 |
| 2017/0045030 A1* | 2/2017 | Senthoorpandian | .... | F03D 13/10 |
| 2019/0085818 A1* | 3/2019 | Neumann | ............... | F03D 13/10 |

FOREIGN PATENT DOCUMENTS

| | | |
|---|---|---|
| EP | 2924284 B1 | 5/2017 |
| KR | 101400205 B1 | 5/2014 |
| KR | 101607691 B1 | 3/2016 |
| WO | WO2014/076825 A1 | 5/2014 |

OTHER PUBLICATIONS

International Search Report, dated Dec. 11, 2019 for International application No. PCT/US2019/048591.

\* cited by examiner

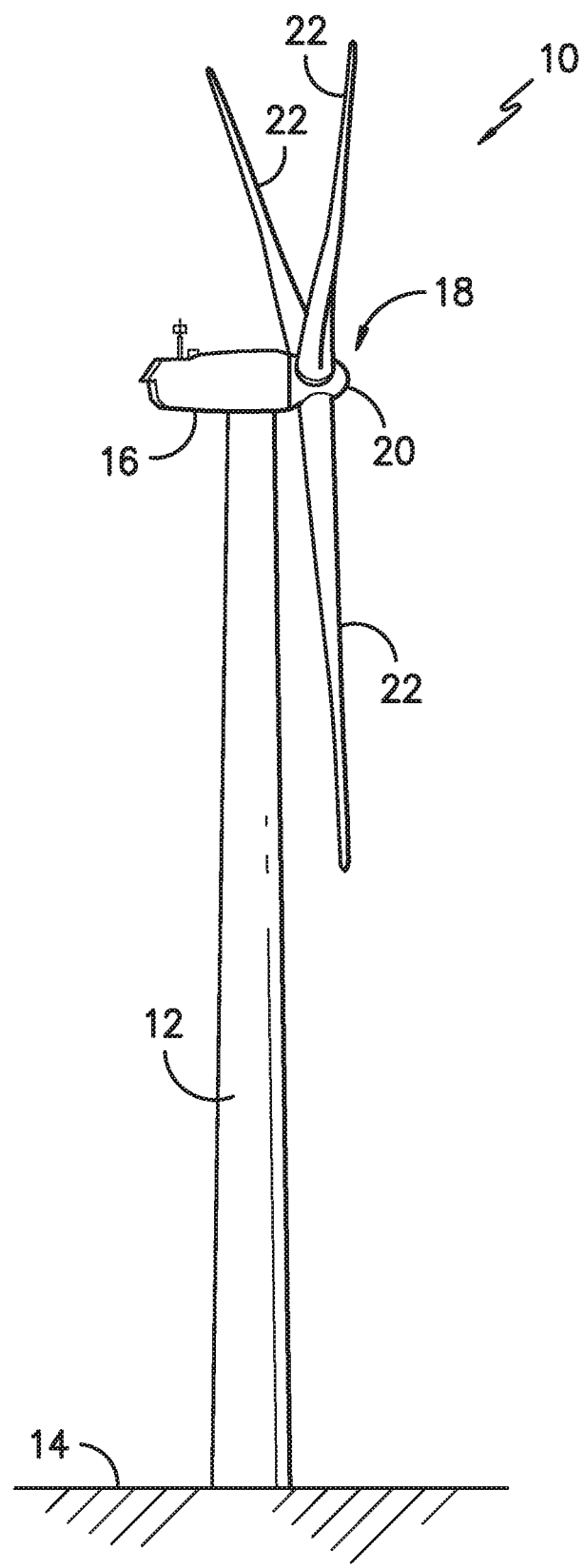
FIG. -1-

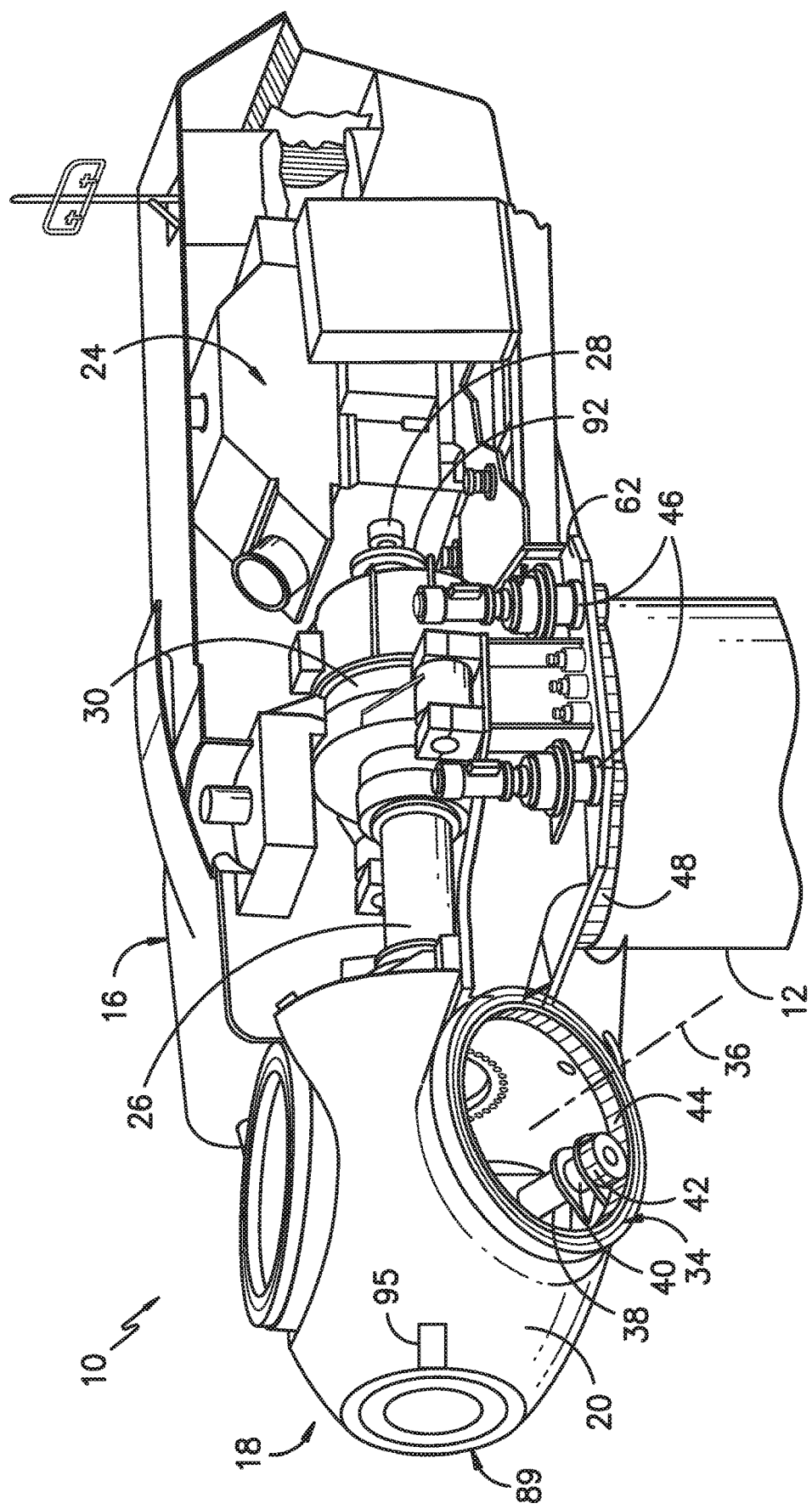
FIG. -2-

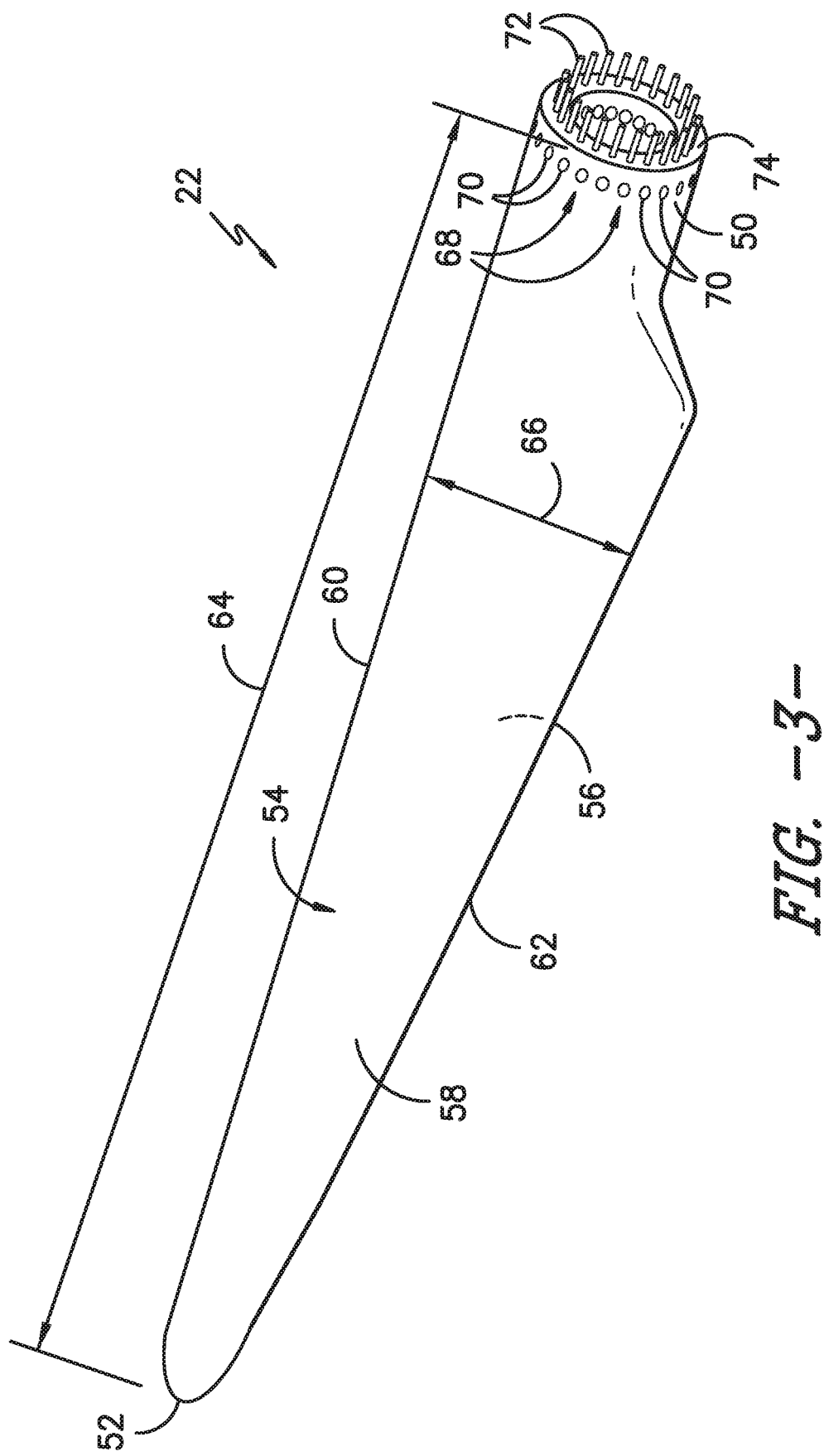
FIG. -3-

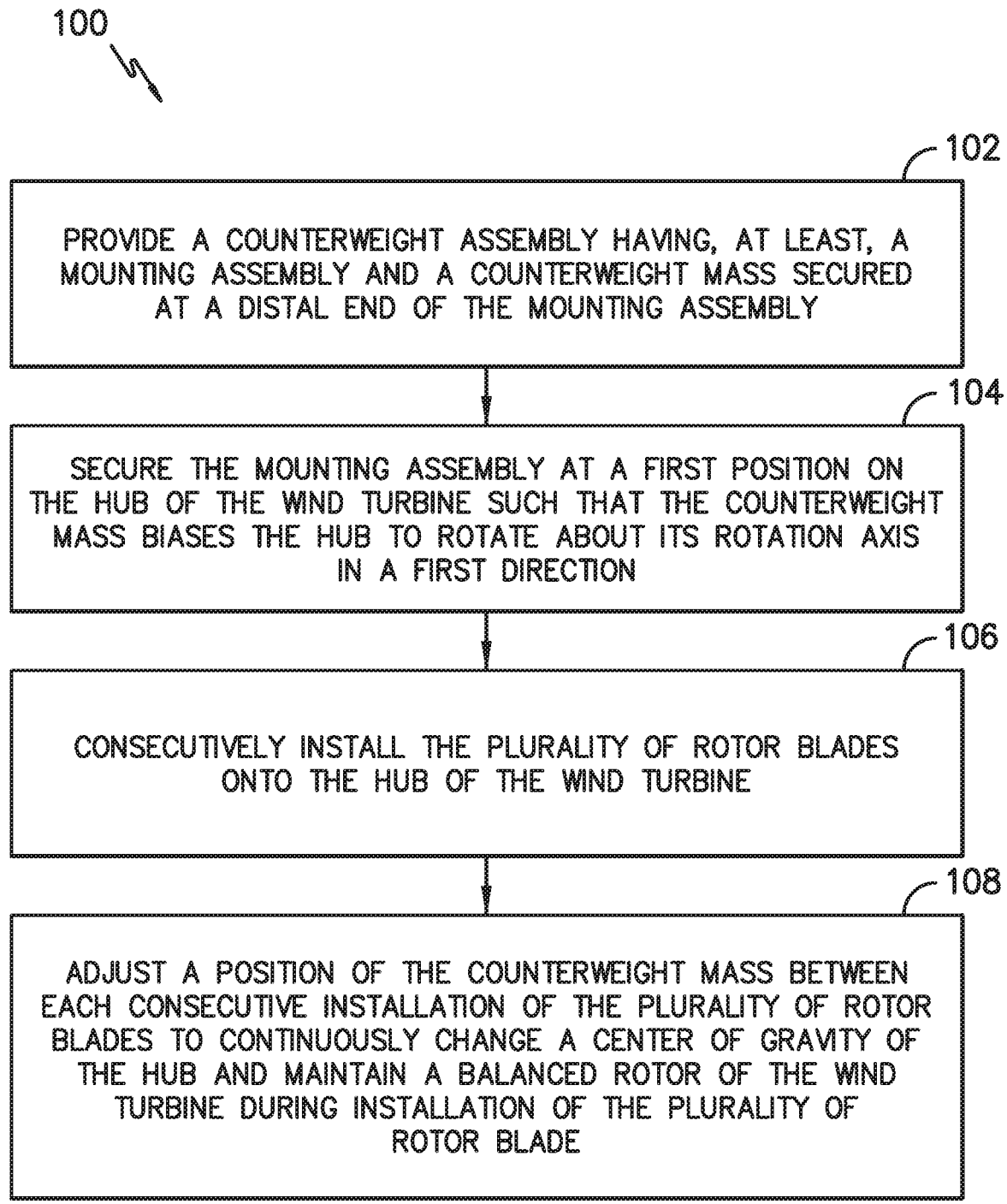
FIG. -4-

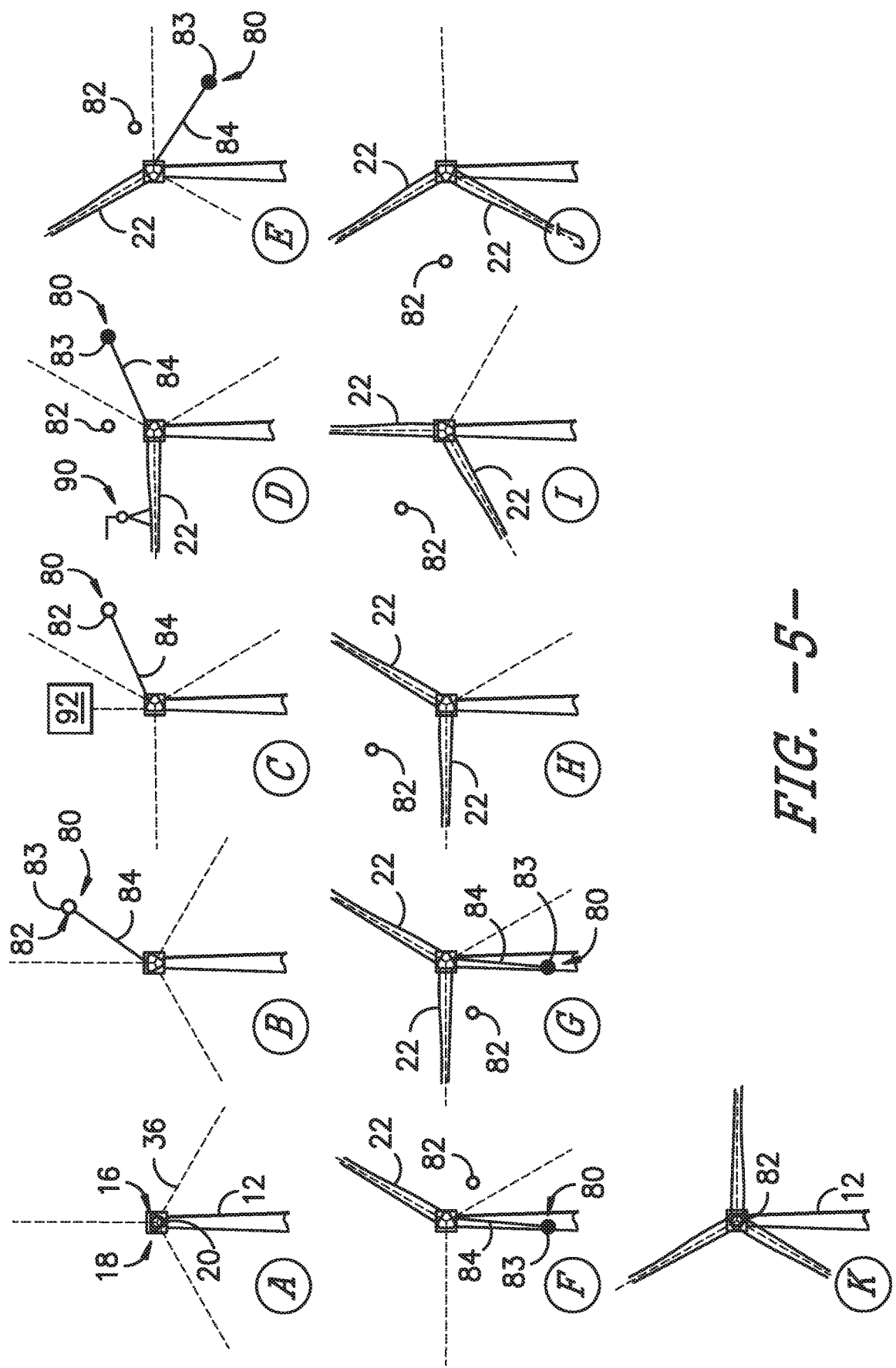
FIG. -5-

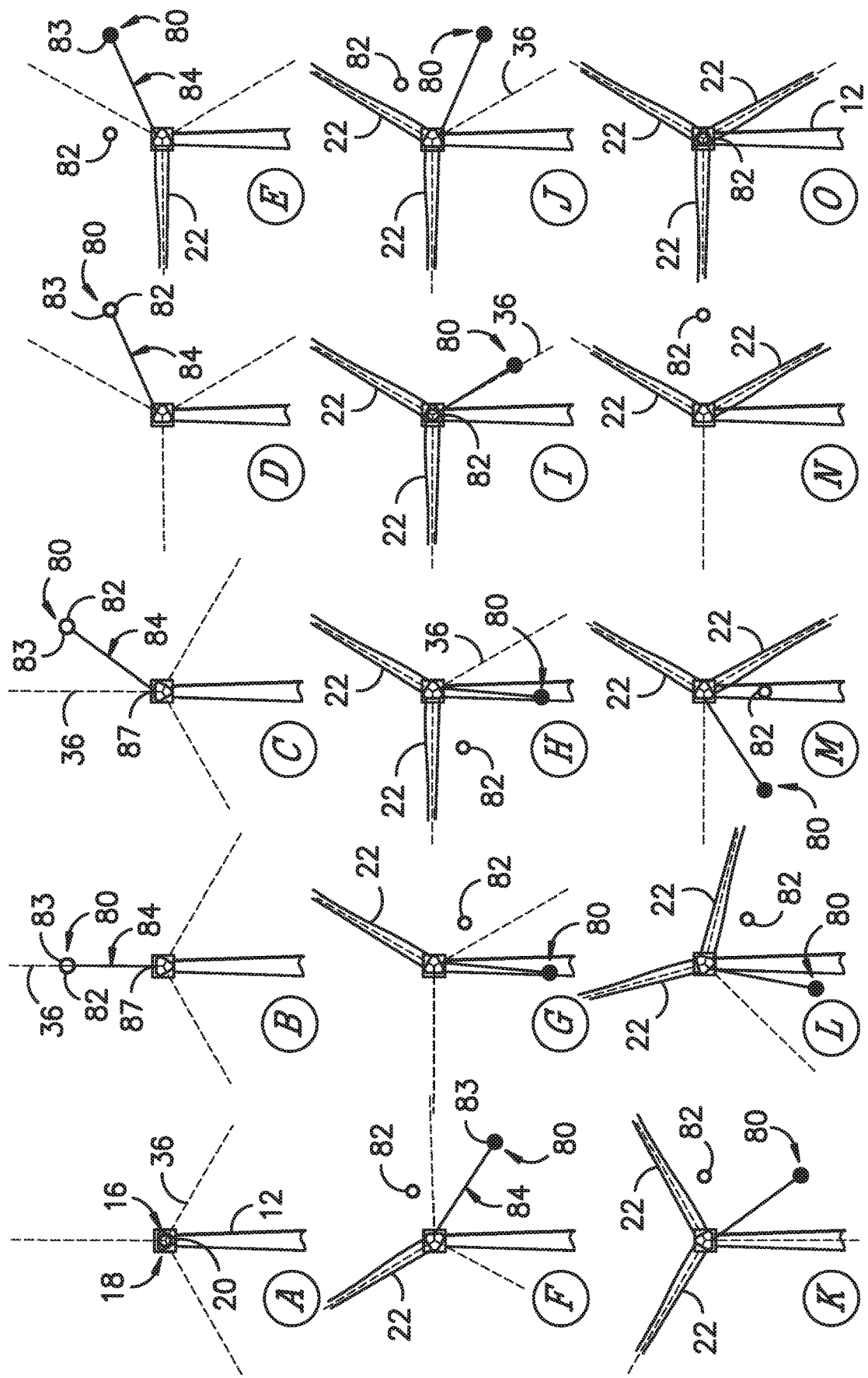

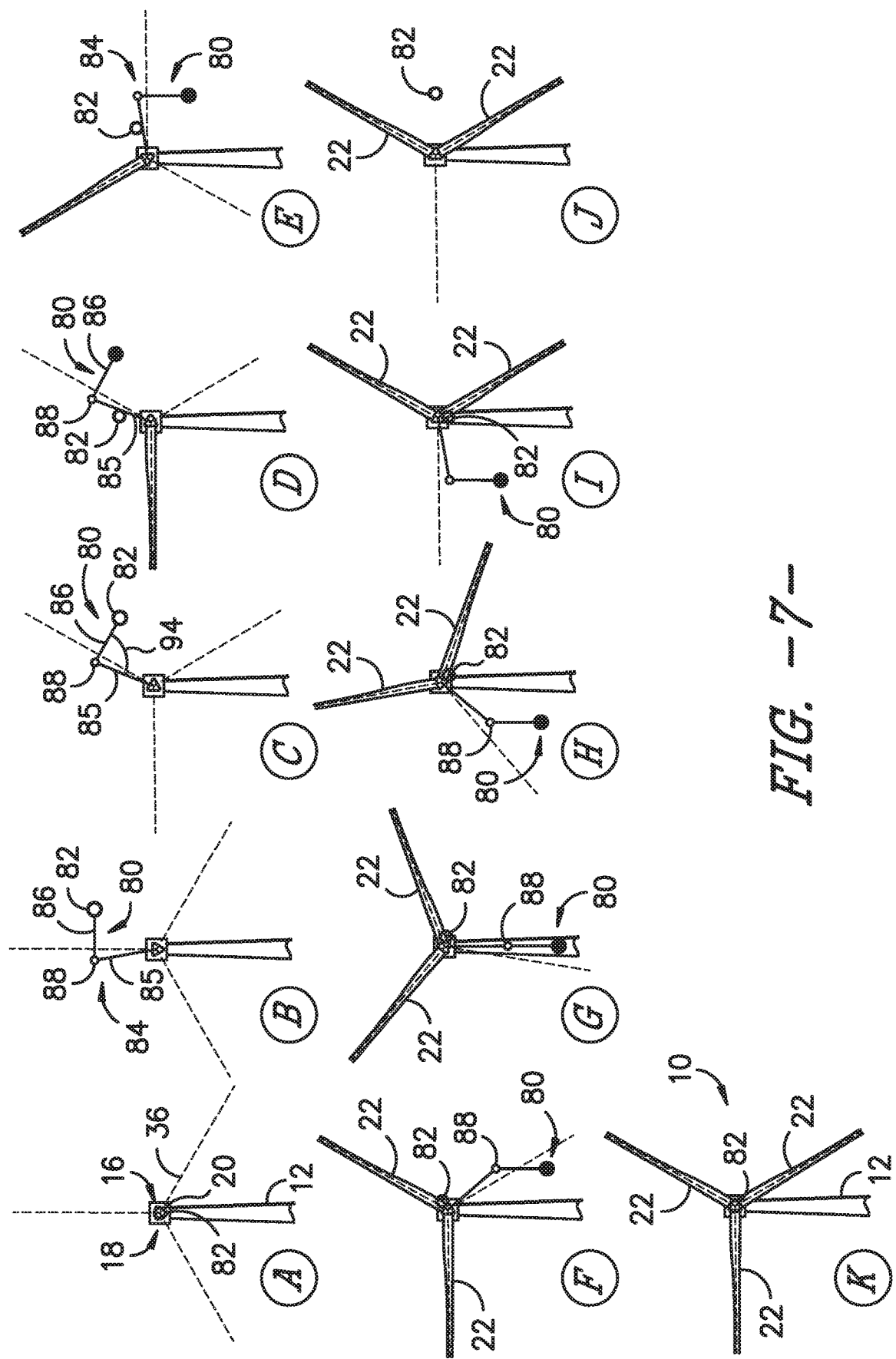
FIG. -7-

COUNTERWEIGHT ASSEMBLY FOR USE DURING SINGLE BLADE INSTALLATION OF A WIND TURBINE

FIELD

The present disclosure relates generally to wind turbines, and more particularly to a counterweight assembly for use during single blade installation of a wind turbine.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Typically, to initially install a rotor blade onto the wind turbine hub, a significantly large crane must be transported to the wind turbine site in order to provide a means for raising the rotor blade relative to the hub. Unfortunately, it is often extremely expensive to both transport the crane to the wind turbine site and operate the crane for the amount of time necessary to install the rotor blade(s). As a result, the costs of employing such large cranes currently accounts for a significant portion of the overall costs associated with initial wind turbine installations.

In addition, as wind turbines continue to increase in size, cranes having the capacity to lift a fully-assembled rotor to certain tower heights are often unavailable in certain geographic locations. Therefore, in such locations, a single blade installation (SBI) process is required. In the SBI process, the hub and rotor blades are installed atop the tower sequentially in consecutive lifts. More specifically, an unbalanced rotor turning gear (URTG) drive is typically installed on the backside of the main gearbox which meshes with the teeth on the brake disc. One or more cranes then lift the hub atop the tower so that the hub can be secured to the nacelle. The entire drivetrain is then rotated using the URTG drive such that a first axis of the hub is positioned horizontally and a rotor lock is applied. A first rotor blade can then be installed in a horizontal position. After the first rotor blade is secured and the crane(s) have released the blade, the URTG device is used to rotate the hub through 120° so that the next rotor blade can be installed. This process is repeated until all rotor blades have been installed.

During the SPI process, however, the static and aerodynamic load of the unbalanced rotor (e.g. when only one or two rotor blades have been installed) exceeds the load bearing capacity of the wind turbine drivetrain, i.e. the gearbox. For example, the highest static load on the drivetrain typically occurs when there is only one rotor blade positioned horizontally or two rotor blades in a "sideways-V" position. As such, the gearbox and/or the gearbox housing may suffer irreparable damage during the SBI process.

Accordingly, improved methods and related systems the SBI process that utilizes a counterweight assembly to address the aforementioned issues would be welcomed in the art.

BRIEF DESCRIPTION

Aspects and advantages of the invention will be set forth in part in the following description, or may be obvious from the description, or may be learned through practice of the invention.

In one aspect, the present disclosure is directed to a method for installing a plurality of rotor blades to a rotatable hub secured atop a tower of a wind turbine. The method includes providing a counterweight assembly having, at least, a mounting assembly and a counterweight mass secured at a distal end of the mounting assembly. The method also includes securing the mounting assembly at a first position on the hub of the wind turbine such that the counterweight mass biases the hub to rotate about its rotation axis in a first direction. Further, the method includes consecutively installing the plurality of rotor blades onto the hub of the wind turbine. Moreover, the method includes adjusting a position of the counterweight mass between each consecutive installation of the plurality of rotor blades to continuously change a center of gravity of the hub and maintain a balanced rotor of the wind turbine during installation of the plurality of rotor blades.

In one embodiment, a proximal end of the mounting assembly may be fixed with respect to the hub. In such embodiments, the step of securing the mounting assembly of the counterweight assembly at the first position on the hub of the wind turbine such that the counterweight mass biases the hub to rotate about its rotation axis in a first direction may include positioning the hub with a first pitch axis in a twelve o'clock position, a second pitch axis between a three o'clock position and a six o'clock position, and a third pitch axis between the six o'clock position and a nine o'clock position and securing the mounting assembly between the first pitch axis and the second pitch axis.

In another embodiment, the proximal end of the mounting assembly may be secured to the hub at a hinge point. In such embodiments, the step of adjusting the position of the counterweight mass between each consecutive installation of the plurality of rotor blades may include securing the mounting assembly to a pitch bearing of a pitch system of the wind turbine, the pitch system having a pitch drive mechanism, the mounting assembly initially being substantially parallel to a pitch axis of the pitch bearing, and allowing the counterweight mass to rotate about the hinge point of the hub to bias the hub to rotate about its rotation axis in the first direction.

In further embodiments, the step of adjusting the position of the counterweight mass between each consecutive installation of the plurality of rotor blades may include rotating the counterweight mass about the pitch axis via the pitch drive mechanism, e.g. to further bias the hub to rotate about its rotation axis in the first direction.

In additional embodiments, the step of adjusting the position of the counterweight mass between each consecutive installation of the plurality of rotor blades further comprises changing a direction of rotation of the counterweight mass in an opposite direction of the first direction after first and second rotor blades of the plurality of rotor blades are installed.

In several embodiments, the mounting assembly may include a set of arm members. More specifically, in one embodiment, the set of arm members may include a first arm member and a second arm member, with the second arm member being secured to the first arm member at a controllable hinge point. In such embodiments, the step of adjusting the position of the counterweight mass between each consecutive installation of the plurality of rotor blades may include initially securing the second arm member to the first arm member at a first angle, and adjusting the first angle by rotating the second arm member about the controllable hinge point as the hub rotates about its rotation axis and subsequent rotor blades are installed to the hub.

In further embodiments, the method may include limiting rotation of the second arm member with respect to the first arm member via, e.g. a mechanical stop.

In another embodiment, the method may also include affixing an outer race of a slewing ring bearing to a front, exterior location of the hub and allowing an inner race of the slewing ring bearing to rotate with respect to the outer race. In addition, the method may include mounting the first arm member to the slewing ring bearing. As such, rotation of the inner race of the slewing ring bearing allows for rotation of the arm member and the counterweight mass. In such embodiments, the inner race of the slewing ring bearing may include gear teeth that mesh with a drive mechanism, the drive mechanism configured to drive rotation of the inner race with respect to the outer race.

In still further embodiments, the method may include locking the counterweight mass in a predetermined position.

In another aspect, the present disclosure is directed to a counterweight assembly for maintaining balance of a rotor of a wind turbine during installation of a plurality of rotor blades onto a rotatable hub secured atop a tower of the wind turbine. The counterweight assembly includes a counterweight mass configured to be moved to multiple positions between consecutive installations of the plurality of rotor blades to continuously change a center of gravity of the hub and maintain a balanced rotor of the wind turbine during installation of the plurality of rotor blades and a mounting assembly having a proximal end and a distal end spaced apart from the proximal end to provide a predetermined distance between the counterweight mass and the hub. Further, the proximal end is configured for securing the mounting assembly to the hub, such that, when the mounting assembly is secured to the hub, the counterweight mass biases the hub to rotate about its rotation axis.

In one embodiment, the counterweight assembly may also include a lifting device for lifting each of the plurality of rotor blades consecutively atop the tower of the wind turbine. In another embodiment, the counterweight assembly may include a rotor drive mechanism for rotating or braking the rotor during installation of the plurality of rotor blades.

In several embodiments, the counterweight mass may move to the multiple positions between consecutive installations of the plurality of rotor blades via gravity. In alternative embodiments, the counterweight assembly may include a rotating mechanism for rotating the counterweight mass. For example, in one embodiment, the rotating mechanism may include an existing pitch system, the rotor drive mechanism, and/or an additional bearing drive system secured to a front, exterior location on the hub of the wind turbine. It should be understood that the counterweight assembly may further include any of the additional features and/or embodiments described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a wind turbine according to one embodiment of the present disclosure;

FIG. 2 illustrates a perspective, internal view of one embodiment of a nacelle of a wind turbine according to the present disclosure;

FIG. 3 illustrates a perspective view of one embodiment of a rotor blade according to the present disclosure;

FIG. 4 illustrates a flow diagram of one embodiment of a method for installing a plurality of rotor blades to a rotatable hub secured atop a tower of a wind turbine according to the present disclosure;

FIG. 5 illustrates a schematic diagram of one embodiment of a sequence for consecutively installing a plurality of rotor blades to a hub mounted atop a tower of a wind turbine according to the present disclosure;

FIG. 6 illustrates a schematic diagram of another embodiment of a sequence for consecutively installing a plurality of rotor blades to a hub mounted atop a tower of a wind turbine according to the present disclosure;

FIG. 7 illustrates a schematic diagram of yet another embodiment of a sequence for consecutively installing a plurality of rotor blades to a hub mounted atop a tower of a wind turbine according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to various methods for consecutively installing a plurality of rotor blades to a rotatable hub secured atop a tower of a wind turbine. Specifically, as will become apparent from the description provided below, the disclosed methods utilize a counterweight that can change the center of gravity of the rotor of the wind turbine in order to drive the rotor forward without putting new demands on components.

Referring now to the drawings, FIG. 1 illustrates a side view of one embodiment of a wind turbine 10 according to the present disclosure. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 19 may include more or less than three rotor blades 22. Each rotor blade 22 may be spaced about the hub 20 to facilitate rotating the rotor 19 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main shaft 26 coupled to the hub 20 for rotation therewith. The generator 24 may then be coupled to the main shaft 26 such that rotation of the main shaft 26 drives the generator 24. For instance, in the illustrated embodiment, the generator 24 includes a generator shaft 28 rotatably coupled to the main shaft 26 through a gearbox 40. However, in other embodiments, it should be appreciated that the generator shaft 28 may be rotatably coupled directly to the main shaft 26. Alternatively, the generator 24 may be directly rotatably coupled to the main shaft 26. In addition, as shown, it should be appreciated that the main shaft 26 may generally be supported within the nacelle 16 by a support frame or bedplate 62 positioned atop the wind turbine tower 12.

Each rotor blade 22 may also include a pitch adjustment mechanism 34 configured to rotate each rotor blade 22 about its pitch axis 36. Further, each pitch adjustment mechanism 34 may include a pitch drive motor 38 (e.g., any suitable electric, hydraulic, or pneumatic motor), a pitch drive gearbox 40, and a pitch drive pinion 42. In such embodiments, the pitch drive motor 38 may be coupled to the pitch drive gearbox 40 so that the pitch drive motor 38 imparts mechanical force to the pitch drive gearbox 40. Similarly, the pitch drive gearbox 40 may be coupled to the pitch drive pinion 42 for rotation therewith. The pitch drive pinion 42 may, in turn, be in rotational engagement with a pitch bearing 44 coupled between the hub 20 and a corresponding rotor blade 22 such that rotation of the pitch drive pinion 42 causes rotation of the pitch bearing 44. Thus, in such embodiments, rotation of the pitch drive motor 38 drives the pitch drive gearbox 40 and the pitch drive pinion 42, thereby rotating the pitch bearing 44 and the rotor blade 22 about the pitch axis 36. Similarly, the wind turbine 10 may include one or more yaw drive mechanisms 46 configured to change the angle of the nacelle 16 relative to the wind (e.g., by engaging a yaw bearing 48 of the wind turbine 10).

Referring now to FIG. 3, a perspective view of one of the rotor blades 22 shown in FIG. 1 is illustrated in accordance with aspects of the present subject matter. As shown, the rotor blade 22 includes a blade root 50 configured for mounting the rotor blade 22 to the hub 20 of a wind turbine 10 (FIG. 1) and a blade tip 52 disposed opposite the blade root 50. A body 54 of the rotor blade 22 may extend lengthwise between the blade root 50 and the blade tip 52 and may generally serve as the outer shell of the rotor blade 22. As is generally understood, the body 54 may define an aerodynamic profile (e.g., by defining an airfoil shaped cross-section, such as a symmetrical or cambered airfoil-shaped cross-section) to enable the rotor blade 22 to capture kinetic energy from the wind using known aerodynamic principles. Thus, the body 54 may generally include a pressure side 56 and a suction side 58 extending between a leading edge 60 and a trailing edge 62. Additionally, the rotor blade 22 may have a span 64 defining the total length of the body 54 between the blade root 50 and the blade tip 52 and a chord 66 defining the total length of the body 54 between the leading edge 60 and the trailing edge 62. As is generally understood, the chord 66 may vary in length with respect to the span 64 as the body 54 extends from the blade root 50 to the blade tip 52.

Moreover, as shown in FIG. 3, the rotor blade 22 may also include a plurality of T-bolts or root attachment assemblies 68 for coupling the blade root 22 to the hub 20 of the wind turbine 10. In general, each root attachment assembly 68 may include a barrel nut 70 mounted within a portion of the blade root 50 and a root bolt 72 coupled to and extending from the barrel nut 70 so as to project outwardly from a root end 74 of the blade root 50. By projecting outwardly from the root end 74, the root bolts 72 may generally be used to couple the blade root 50 to the hub 20 via one of the pitch bearings 44 (FIG. 2) of the wind turbine 10. For example, the pitch bearing 44 may define a plurality of bolt holes (not shown) configured to receive the root bolts 72.

Referring now to FIG. 4, a flow diagram of one embodiment of a method 100 for installing a plurality of rotor blades to a rotatable hub secured atop a tower of a wind turbine is illustrated. In general, the method 100 will be described herein with reference to the wind turbine and rotor blades 22 shown in FIGS. 1-3. However, it should be appreciated that the disclosed method 100 may be implemented with any wind turbine having any other suitable configurations. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at 102, the method 100 includes providing a counterweight assembly 80 having, at least, a mounting assembly 84 and a counterweight mass 83 secured at a distal end of the mounting assembly 84. As shown at 104, the method 100 may include securing the mounting assembly 84 at a first position on the hub 20 of the wind turbine 10 such that the counterweight mass 83 biases the hub 20 to rotate about its rotation axis in a first direction. As shown at 106, the method 100 may include consecutively installing the plurality of rotor blades 22 onto the hub 20 of the wind turbine 10. As shown at 108, the method 100 may include adjusting a position of the counterweight mass 83 between each consecutive installation of the rotor blades 22 to continuously change a center of gravity 82 of the hub 20 and maintain a balanced rotor 18 during installation of the rotor blades 22.

The method 100 of FIG. 4 can be better understood with respect to the various embodiments illustrated in FIGS. 5-7. For example, FIG. 5 illustrates a schematic diagram of one embodiment of the sequence for installing the rotor blades 22 to the hub 20. More particularly, FIG. 5 illustrates the sequence for installing the rotor blades 22 to the hub 20 using a static or fixed counterweight assembly 80, with the center of gravity 82 illustrated in each step. Starting at (A), the hub 20 (i.e. without the rotor blades 22) is mounted to the nacelle 16 atop the tower 12.

As shown at (B), the counterweight assembly 80 is secured to the hub 20. More specifically, as shown, the counterweight assembly 80 may include at least one beam 85 having a proximal end secured to the hub 20 and a distal end with a counterweight mass 83 secured thereto. Thus, as shown, the mounting assembly 84 may be secured at a first position on the hub 20 such that the counterweight mass 83 biases the hub 20 to rotate about its rotation axis in a first direction (i.e. clockwise). For example, as shown in the illustrated embodiment, the hub 20 may be positioned with a first pitch axis 36 in a twelve o'clock position, a second pitch axis 36 between a three o'clock position and a six o'clock position, and a third pitch axis 36 between the six o'clock position and a nine o'clock position. Thus, as shown, the counterweight assembly 80 may be secured between the first and second pitch axes so as to bias the hub 20 to rotate about its rotation axis in the clockwise direction.

Thus, the counterweight mass 83 described herein may be adjusted to multiple positions via gravity or an active rotating mechanism. For example, in one embodiment, the rotating mechanism may include the existing pitch drive mechanism 34, the rotor drive mechanism 92, and/or an additional bearing drive system 95 secured to a front, exterior location on the hub 20. For example, referring back to FIG. 2, an additional slewing ring bearing 89 may be mounted to the front, exterior location of the hub 20. Further, as shown, the slewing ring bearing 89 includes an outer race 91 and an inner race 93 that rotates with respect to the outer race 91 via a plurality of roller elements (not shown). In such embodiments, the mounting assembly 84 may be mounted to the inner race 93 of the slewing ring bearing 89. As such, rotation of the inner race 93 allows for rotation of the mounting assembly 84 and therefore the counterweight mass 83 as described herein. More specifically, in such embodiments, the inner race 93 may include gear teeth (like the teeth of the pitch bearing 44) that mesh with an additional drive mechanism 95. As such, the drive mechanism 95 is configured to drive rotation of the inner race 93 with respect to the outer race 91.

Referring back to FIG. 4, as shown at (C), the rotor 18 can easily be rotated to the desired position to install the first rotor blade (i.e. in a horizontal position). More specifically, as shown, the counterweight mass 83 is configured to propel the rotor 18 in a clockwise direction. In addition, as shown in FIG. 2, a rotor drive mechanism 92, e.g. behind the gearbox 30, may be positioned in the nacelle 16 for rotating or braking the rotor 18 during installation of the rotor blades 22. More particularly, in one embodiment, the rotor drive mechanism 92 may be an unbalanced rotor turning gear (URTG) drive. As such, the counterweight mass 83, the rotor drive mechanism 92, and combinations thereof may be used to rotate the rotor 18 to the desired positions for consecutively installing each rotor blade thereto.

Referring still to FIG. 5, as shown at (D), the first rotor blade 22 is installed in the horizontal position (i.e. the 9 o'clock position). For example, as shown at (D), a lifting device 90 (such as a crane) may be used to lift each rotor blade 22 consecutively atop the tower 12 of the wind turbine 10. Further, as shown at (E), the counterweight assembly 80 is adjusted or moved to a different, second position as the rotor 18 is rotated to the mounting position for the second rotor blade 22. As such, the counterweight mass 83 assists in balancing the weight of the first rotor blade as the rotor 18 is rotated. Thus, as shown at (F), the illustrated rotor 18 is shown in the mounting position for the second rotor blade 22, i.e. in the 9 o'clock position. As shown at (G), the second rotor blade 22 can then be secured to the hub 20. For example, as shown, the lifting device 90 is configured to lift the second rotor blade 22 up to the hub 20 such that the second rotor blade 22 can be secured to the hub 20. In certain embodiments, removal of the counterweight assembly 80 may also require a gripping device to be able to grip the installed rotor blades with the trailing edges pointing upwards and downward, respectively. As shown at (H), the counterweight assembly 80 can then be removed. For example, in one embodiment, the lifting device 90 may also be used to lower the counterweight assembly 80 to the ground. As shown at (I) and (J), the rotor 18 is then rotated in an opposite, or clockwise direction to the mounting position for the third rotor blade 22 (i.e. the 3 o'clock position). Accordingly, as shown at (K), the third rotor blade 22 is then secured to the hub 20. For example, in one embodiment, the lifting device 90 may also be used to lift the third rotor blade up to the hub 20 such that the third rotor blade 22 can be secured to the hub 20.

Referring now to FIG. 6, another embodiment of a sequence for installing the rotor blades 22 to the hub 20 using a pitched counterweight assembly 80 is illustrated. As shown at (A), the hub 20 (i.e. without the rotor blades 22) is mounted to the nacelle 16 atop the tower 12. As shown at (B), the counterweight assembly 80 is secured to the hub 20. More specifically, as shown, the counterweight assembly 80 may include the counterweight mass 83 secured to the hub 20 via the mounting assembly 84. In addition, as shown in the illustrated embodiment, the proximal end of the mounting assembly 84 may be secured to the hub 20 at a hinge point 87. Thus, as shown, the counterweight assembly 80 may be initially installed such that the mounting assembly 84 is generally parallel with one of the pitch axes 36. In addition, in certain embodiments, the mounting assembly 84 may be mounted to the pitch bearing 44 such that the pitch drive mechanism 32 can rotate the counterweight assembly 80 to different positions. For example, as shown from (B) and (C), the counterweight assembly 80 is rotated about the pitch axis 36 (with the rotor position staying the same) so as to bias the hub 20 to rotate about its rotation axis in the clockwise direction. Further, as shown in subsequent steps, the counterweight mass 83 can act as a pendulum and swing to multiple positions to shift the center of gravity 82 of the rotor 18. In such embodiments, the counterweight mass 83 may be locked in any suitable position as desired to maintain its location.

Thus, as shown at (D), the rotor 18 can easily be rotated to the first mounting position for the first rotor blade 22 to be installed (i.e. the 9 o'clock position). As mentioned, the rotor 18 may be rotated using the counterweight assembly 80, the rotor drive mechanism 92, and/or combinations thereof. As shown at (E), the first rotor blade 22 can then be installed in the horizontal position (e.g. the 9 o'clock position). As shown at (F), the counterweight assembly 80 is adjusted to a different, second position as the rotor 18 is rotated toward the mounting position for the second rotor blade 22 (e.g. the 9 o'clock position). Accordingly, as shown at (G), the rotor 18 is in the mounting position (e.g. the 9 o'clock position) for the second position. Thus, as shown at (H), the second rotor blade may be secured to the hub 20 in the 9 o'clock position. As shown at (I) and (J), the counterweight assembly 80 may be adjusted (e.g. by swinging the mass 83 similar to a pendulum) to an opposing side of the blade axis 36 (i.e. in a counterclockwise direction) so as to shift the center of gravity 82 as shown after first and second rotor blades of the rotor blades 22 are installed. As shown at (K), (L) and (M), the counterweight assembly 80 is continuously adjusted as the rotor 18 is rotated to the mounting position for the third rotor blade (i.e. the 3 o'clock position). As shown at (N), the counterweight assembly 80 can then be removed, e.g. via the lifting device 90. Accordingly, as shown at (0), the third rotor blade 22 is then secured to the hub 20 in the 9 o'clock position.

Referring now to FIG. 7, yet another embodiment of a sequence for installing the rotor blades 22 to the hub 20 using a counterweight assembly 80 constructed of a plurality of arm members 84, 86 is illustrated. As shown at (A), the hub 20 (i.e. without the rotor blades 22) is mounted to the nacelle 16 atop the tower 12 of the wind turbine. As shown at (B), the counterweight assembly 80 is secured to the hub 20. More specifically, as shown, the counterweight assembly 80 may include the counterweight mass 83 secured to the hub 20 via the mounting assembly 84. For example, as shown, the mounting assembly 84 may include a set of arm members. More particularly, as shown, the set of arm members may include a first arm member 85 and a second arm member 86 connected to the first arm member 85 via a controlled hinge point 88. Further, as shown, the counterweight 83 may be secured at the end of the second arm member 86. Thus, as shown at (B), the second arm member 86 may be initially secured to the first arm member 85 at a first angle.

As shown at (C), the rotor 18 is rotated to the first mounting position for the first rotor blade (i.e. a horizontal position) as the counterweight assembly 80 shifts the center of gravity 82 of the rotor 18. As shown at (D), the first rotor blade is installed in the horizontal position (i.e. the 9 o'clock position) and the center of gravity 82 shifts back towards the center of the rotor 16. As shown at (E), the counterweight assembly 80 is adjusted to a different, second position as the rotor 18 is rotated to the mounting position for the second rotor blade. More particularly, as shown, during rotation, the controllable hinge point 88 may be at least partially released. In other words, the initial or first angle may be adjusted by rotating the second arm member 86 about the controllable hinge point 88 as the hub 20 rotates about its rotation axis (or before) and subsequent rotor blades 22 are installed to the hub 22.

Still referring to FIG. 7, as such, as shown at (F), the second rotor blade 22 is secured to the hub 20 and the controllable hinge point 88 is further released. As shown at (G), the counterweight assembly 80 is further adjusted to change the center of gravity 82 by completely releasing the hinge point 88. As shown at (H) and (I), the counterweight assembly 80 is further adjusted by further rotating the second arm member 86 about the hinge point 88 as the rotor 18 is rotated to the mounting position for the third rotor blade (i.e. the 9 o'clock position). As shown at (J), the counterweight assembly 80 can then be removed. As shown at (K), the third rotor blade 22 is then secured to the hub 20. It should also be understood that rotation of the second arm member 86 with respect to the first arm member 85 may be limited, e.g. via a mechanical stop 94, so as to ensure that the angle therebetween is maintained within a suitable range.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for installing a plurality of rotor blades to a rotatable hub secured atop a tower of a wind turbine, the method comprising:
   providing a counterweight assembly having, at least, a mounting assembly having a distal end and a proximal end and a counterweight mass secured at the distal end;
   securing the proximal end of the mounting assembly at a first position on the hub of the wind turbine such that the counterweight mass biases the hub to rotate about its rotation axis in a first direction, wherein the proximal end of the mounting assembly is secured to the hub via a hinge point;
   consecutively installing the plurality of rotor blades onto the hub of the wind turbine; and,
   adjusting a position of the counterweight mass between each consecutive installations of each rotor blade of the plurality of rotor blades by rotating the mounting assembly about the hinge point to continuously change a center of gravity of the hub and maintain a balanced rotor of the wind turbine during installation of each of the plurality of rotor blades.

2. The method of claim 1, wherein a proximal end of the mounting assembly is fixed with respect to the hub.

3. The method of claim 2, wherein securing the mounting assembly of the counterweight assembly at the first position on the hub of the wind turbine such that the counterweight mass biases the hub to rotate about its rotation axis in a first direction further comprises:
   positioning the hub with a first pitch axis in a twelve o'clock position, a second pitch axis between a three o'clock position and a six o'clock position, and a third pitch axis between the six o'clock position and a nine o'clock position; and,
   securing the mounting assembly between the first pitch axis and the second pitch axis.

4. The method of claim 1, wherein adjusting the position of the counterweight mass between each consecutive installation of the plurality of rotor blades further comprises:
   securing the mounting assembly to a pitch bearing of a pitch system of the wind turbine, the pitch system having a pitch drive mechanism, the mounting assembly initially being substantially parallel to a pitch axis of the pitch bearing; and,
   allowing the counterweight mass to rotate about the hinge point of the hub to bias the hub to rotate about its rotation axis in the first direction.

5. The method of claim 4, wherein adjusting the position of the counterweight mass between each consecutive installation of the plurality of rotor blades further comprises rotating the counterweight mass about the pitch axis via the pitch drive mechanism.

6. The method of claim 4, wherein adjusting the position of the counterweight mass between each consecutive installation of the plurality of rotor blades further comprises changing a direction of rotation of the counterweight mass in an opposite direction of the first direction after first and second rotor blades of the plurality of rotor blades are installed.

7. The method of claim 1, wherein the mounting assembly further comprises a set of arm members, the set of arm members comprising a first arm member and a second arm member, the second arm member secured to the first arm member at an additional, controllable hinge point.

8. The method of claim 7, wherein adjusting the position of the counterweight mass between each consecutive installation of the plurality of rotor blades further comprises:

initially securing the second arm member to the first arm member at a first angle; and, adjusting the first angle by rotating the second arm member about the controllable hinge point as the hub rotates about its rotation axis and subsequent rotor blades are installed to the hub.

9. The method of claim 8, further comprising limiting rotation of the second arm member with respect to the first arm member via at least one mechanical stop.

10. The method of claim 1, further comprising:

affixing an outer race of a slewing ring bearing to a front, exterior location of the hub and allowing an inner race of the slewing ring bearing to rotate with respect to the outer race;

mounting the first arm member to the slewing ring bearing, wherein rotation of the inner race of the slewing ring bearing allows for rotation of the arm member and the counterweight mass.

11. The method of claim 10, wherein the inner race of the slewing ring bearing further comprises gear teeth that mesh with a drive mechanism, the drive mechanism configured to drive rotation of the inner race with respect to the outer race.

12. The method of claim 1, further comprising locking the counterweight mass in a predetermined position.

13. A counterweight assembly for maintaining balance of a rotor of a wind turbine during installation of a plurality of rotor blades onto a rotatable hub secured atop a tower of the wind turbine, the counterweight assembly comprising:

a counterweight mass configured to be rotated to multiple positions between consecutive installations of the plurality of rotor blades to continuously change a center of gravity of the hub and maintain a balanced rotor of the wind turbine during installation of the plurality of rotor blades; and, a mounting assembly comprising a proximal end and a distal end, the counterweight mass mounted to the distal end and spaced apart from the proximal end to provide a predetermined distance between the counterweight mass and the hub, the proximal end comprising a hinge point configured for securing the mounting assembly to the hub, such that, when the mounting assembly is secured to the hub, the counterweight mass rotates about the hinge point and biases the hub to rotate about its rotation axis.

14. The counterweight assembly of claim 13, further comprising a lifting device for lifting each of the plurality of rotor blades consecutively atop the tower of the wind turbine.

15. The counterweight assembly of claim 13, further comprising a rotor drive mechanism for rotating or braking the rotor during installation of the plurality of rotor blades.

16. The counterweight assembly of claim 13, wherein the counterweight mass moves to the multiple positions between consecutive installations of the plurality of rotor blades via gravity.

17. The counterweight assembly of claim 15, further comprising a rotating mechanism for rotating the counterweight mass, the rotating mechanism comprising at least one of an existing pitch system, the rotor drive mechanism, or an additional bearing drive system secured to a front, exterior location on the hub of the wind turbine.

18. The counterweight assembly of claim 17, wherein the additional bearing drive system further comprises a slewing ring bearing comprising an outer race and an inner race rotatable with respect to the outer race, the outer race affixed to the front, exterior location of the hub, the inner race comprising gear teeth that mesh with a drive mechanism, the drive mechanism configured to drive rotation of the inner race with respect to the outer race.

19. The counterweight assembly of claim 13, wherein the mounting assembly further comprises a set of arm members, wherein the set of arm members comprises a first arm member and a second arm member, the second arm member hinged to the first arm member at an additional, hinge point.

\* \* \* \* \*